United States Patent [19]
Harley

[11] Patent Number: 5,980,234
[45] Date of Patent: Nov. 9, 1999

[54] BLOW MOLD APPARATUS FOR MINIMAL GATE

[75] Inventor: Craig C. Harley, Lee's Summit, Mo.

[73] Assignee: R & D Tool & Engineering Co.,, Lee's Summit, Mo.

[21] Appl. No.: 09/069,304

[22] Filed: Apr. 29, 1998

[51] Int. Cl.[6] .............................. B29C 45/20; B29C 49/06
[52] U.S. Cl. ....................... 425/533; 264/328.9; 425/568
[58] Field of Search ......................... 264/328.9; 425/533, 425/564, 567, 568, 569

[56] References Cited

U.S. PATENT DOCUMENTS

| | | | |
|---|---|---|---|
| 4,595,552 | 6/1986 | Hahn | 264/328.9 |
| 5,139,724 | 8/1992 | Hofstetter et al. | 264/328.9 |
| 5,254,305 | 10/1993 | Fernandez et al. | 264/328.9 |
| 5,443,381 | 8/1995 | Gallert | 425/564 |
| 5,518,393 | 5/1996 | Gessner | 264/328.9 |
| 5,533,882 | 7/1996 | Gessner et al. | 264/328.9 |
| 5,635,227 | 6/1997 | Whisenhunt et al. | 264/328.9 |
| 5,695,793 | 12/1997 | Bauer | 264/328.9 |

*Primary Examiner*—Robert Davis
*Attorney, Agent, or Firm*—Hovey, Williams, Timmons & Collins

[57] ABSTRACT

An improved mold apparatus (10) includes a cutout (30) between the nozzle cap sealing surface (32) and the injection mold cavity (14) configured for receiving the tip (38) of an insert (20). The cutout (30) shortens the material passage (24) leading to the mold space (22) between the mold cavity (14) and core (12) so that the resulting molded product presents a short gate. The cutout (30) is also configured so that material space surrounds the tip (38) for receiving mold material in order to surround and thermally insulate the tip (38) from the injection mold cavity (14).

3 Claims, 1 Drawing Sheet

BLOW MOLD APPARATUS FOR MINIMAL GATE

BACKGROUND OF THE INVENTION

1. Field of the Invention

The present invention relates to the field of injection stretch blow molding. More particularly, the invention is concerned with an improved mold apparatus including a cutout between the nozzle cap sealing surface and the injection mold cavity configured for receiving the tip of an insert.

2. Description of the Prior Art

In the prior art, a molded preform has a length of mold material called a gate extending from one end. This is the result of mold material present in the material passage leading to the mold space as illustrated in the prior art drawing of FIG. 1. The mold material solidifies in the passage and remains with the preform. Such also occurs in a one-step, integrated process.

The volume of the gate must be accommodated by incorporating a relatively large gate well in the center of the blow mold push-up or crown. This allows the gate to be centered properly and results in more evenly distributed material in the blown bottle.

However, small bottles or those requiring a shorter bottle crown height cannot accommodate readily the volume of the gate. A prior art solution has been to incorporate a gate clipping operation after the preform process in order to shorten the gate and thereby reduce the volume of the gate. This adds expense to the manufacturing process and may affect quality as well.

SUMMARY OF THE INVENTION

The present invention solves the prior art problems mentioned above and provides a distinct advance in the state of the art. In particular, the invention enables the production of a molded product with a minimal gate thereby eliminating the need for a gate clipping operation and minimize or eliminate the gate well in the blow mold crown or push-up.

The preferred mold apparatus in accordance with the present invention includes a cutout between the nozzle cap sealing surface and the injection mold cavity configured for receiving the tip of an insert extending beyond the nozzle cap sealing surface. The cutout shortens the material passage leading to the mold space between the mold cavity and core so that the resulting molded product presents a short gate. The cutout is also configured so that material space surrounds the tip for receiving mold material in order to surround and thermally insulate the tip from the chilled injection mold cavity.

DETAILED DESCRIPTION OF THE PREFERRED EMBODIMENT

Figure 2:
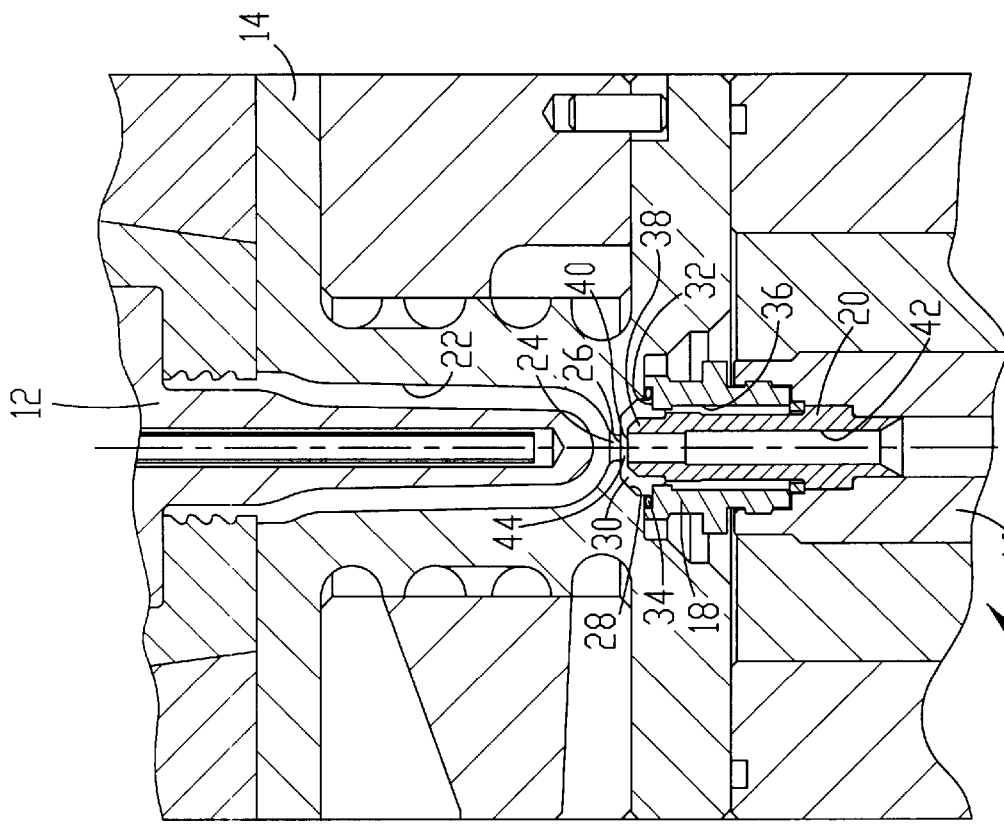
FIG. 2 is a partial sectional view of the preferred mold apparatus in accordance with the present invention.

FIG. 2 illustrates preferred mold apparatus 10 in accordance with the present invention. In the preferred embodiment, apparatus 10 is an injection stretch blow mold apparatus for producing a preform as the molded product. The present invention also encompasses other types of mold apparatus such as those for implementing a one-step, integrated process.

As shown in FIG. 2, apparatus 10 includes core 12, injection mold cavity 14, nozzle body 16 presenting nozzle cap 18, and insert 20. Core 12 and cavity 14 define mold space 22 therebetween for receiving mold material such as PET (polyethylene terephthalate) in order to produce a preform having a wall thickness of between about 0.090 and 0.235 inches, for example. Material passage 24 extends from mold space 22 at the bottom thereof and terminates at passage inlet 26.

Figure 1:
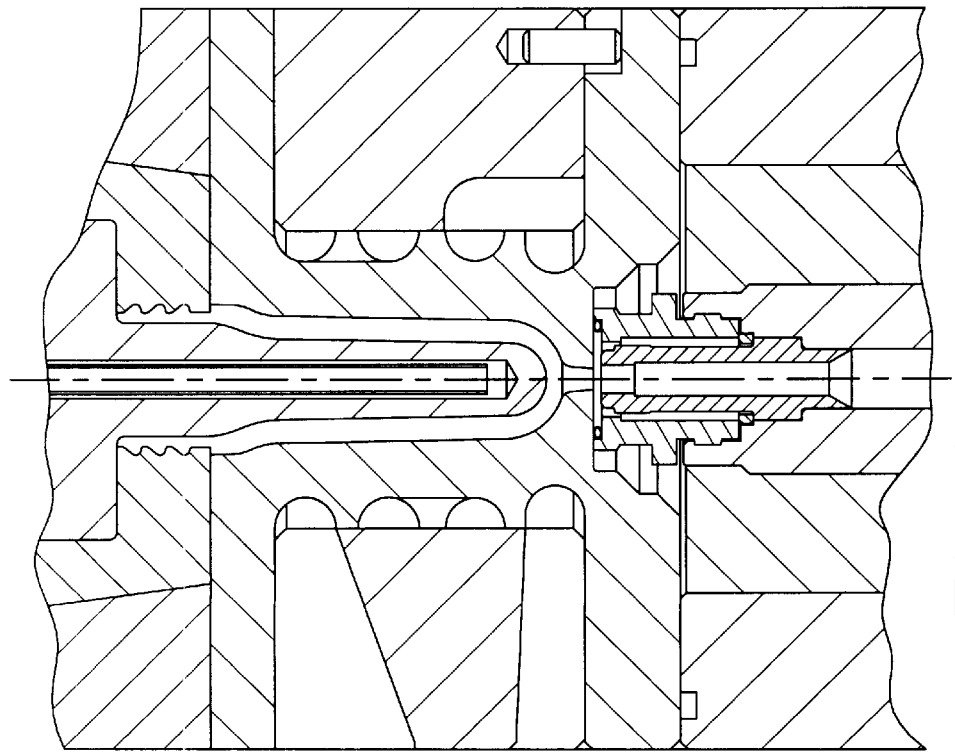
FIG. 1 is a partial sectional view of a prior art mold apparatus.

In the preferred embodiment, cavity 14 is relieved in the vicinity of passage 24 so that cavity walls 28 define cutout 30. This results in passage 24 being shorter as compared to such passage in the prior art as illustrated in FIG. 1. In the preferred embodiment, it is critical that passage 24 present a length between about 0.036 and 0.051 inches to produce a gate of corresponding dimensions in the preform. This produces a gate short enough to eliminate the need for an intermediate gate clipping operation or special accommodation, yet long enough to provide enough material volume for subsequent molding operations. For the same reasons, it is critical that passage 24 present a diameter of between about 0.090 and 0.150 inches.

Nozzle cap 18 presents sealing surface 32 supporting crush ring 34. Ring 34 functions in a manner similar to an O-ring to provide a face seal between nozzle body 16 and cavity 14. The injection mold cavity walls being configured for accommodating lateral shifting of the insert tip relative to the material passage due to thermal expansion and contraction.

Insert 20 is received in opening 36 defined in nozzle cap 18, and includes insert tip 38 extending beyond sealing surface 32 and into cutout 30. The distal end of tip 36 includes material outlet 40 defined therein for discharging mold material received along material channel 42 from a conventional injection mold source. As illustrated in FIG. 2, cutout 30 defines a material space surrounding tip 38.

Material outlet 40 of tip 38 and passage inlet 26 present gap 44 therebetween. In the preferred embodiment, gap 44 is between about 0.015 and 0.045 inches and provides fluid communication with cutout 30.

In operation, it is conventional to heat nozzle body 16 and other associated components in order to maintain the mold material in fluid form. It is also conventional to chill cavity 14 so that the mold material in mold space 22 and passage 24 solidifies in order to produce the desired preform. Gap 44 is the interface between the heated and the chilled components and it is at gap 44 that the solidified preform separates from the fluid mold material of insert 20.

As will be observed in FIG. 2, however, tip 38 extends beyond sealing surface 32 into cutout 30 and is exposed thereby to the chilling effects of mold cavity 14. In order to avoid mold material solidifying in tip 38, the material space in cutout 30 surrounding tip 38 receives mold material. Specifically, the material space receives mold material from material outlet 40 by way of gap 44. In this way, the mold material acts as backfill to surround and thermally insulate tip 38 from cavity 14. This maintains the desired temperature of the mold material within insert 20 so that the gate of the molded product breaks cleanly from the melt region at gap 44 without stringing or freezing off. With the material space filled, mold material received from outlet 40 passes across gap 44 to passage inlet 26 and through passage 24 into mold space 22 to form the molded product having a gate corresponding to the mold material present in passage 24.

Those skilled in the art will appreciate that the present invention encompasses many variations in the preferred embodiment described herein.

Having thus described that embodiment, the following is claimed as new and desired to be secured by Letters Patent:

1. In a mold apparatus including a mold body having an injection mold cavity and a core defining a mold space and defining a material passage extending from the mold space and terminating at a passage inlet, a nozzle cap presenting a sealing surface and having nozzle structure defining an insert-receiving opening, and an insert received in the nozzle cap opening and having insert structure defining a material outlet, the apparatus being operable for delivering mold material from a source thereof through the material outlet to the passage inlet and through the passage into the mold space for producing a molded product having a gate corresponding to the mold material in the passage, the improvement comprising:

injection mold cavity walls defining a cutout between the nozzle cap sealing surface and the passage inlet;

an insert tip included as part of the insert and extending beyond the nozzle cap sealing surface and into said cutout, and presenting the material outlet spaced from the passage inlet with a gap therebetween, said injection mold cavity walls configuring said cutout to present material space surrounding said insert tip for receiving mold material therein from the material outlet by way of said gap as backfill in order to surround and thermally insulate said insert tip from the injection mold cavity, said injection molding cavity walls being configured for accommodating lateral shifting of said insert tip relative to said material passage due to thermal expansion and contraction, said nozzle cap having a longitudinal axis, said sealing surface being transverse to said axis and surrounding said insert; and a crush ring positioned on said sealing surface to provide a face seal between the nozzle cap and the mold body, said cutout terminating radially at said crush ring, said insert having an axially extending material channel leading to said material outlet, said channel being completely open across the width thereof for unobstructed flow of mold material through the channel to the outlet, said material passage and thereby the corresponding gate of the molded product having a length of between about 0.036 and 0.051 inches and a diameter of between about 0.090 and 0.150 inches.

2. The improvement as set forth in claim 1, the apparatus being an injection stretch blow molded apparatus, the molded product being a preform.

3. The improvement as set forth in claim 1, the apparatus being a one-step, integrated process apparatus.

* * * * *